(12) United States Patent
Hartman et al.

(10) Patent No.: US 6,202,983 B1
(45) Date of Patent: Mar. 20, 2001

(54) VALVE SEAL STRUCTURED TO PREVENT CIRCUMFERENTIAL SLIPPAGE

(76) Inventors: Thomas A. Hartman, 700 Capac Ct., St. Louis, MO (US) 63125; Brian T. Hartman, 2253 E. Contessa Cir., Mesa, AZ (US) 85213

( * ) Notice: Subject to any disclaimer, the term of this patent is extended or adjusted under 35 U.S.C. 154(b) by 0 days.

(21) Appl. No.: 09/417,613

(22) Filed: Oct. 13, 1999

(51) Int. Cl.$^7$ ................................. F16J 15/02; F16K 1/22
(52) U.S. Cl. ......................... 251/306; 251/314; 277/641; 137/15.18
(58) Field of Search ..................... 251/306, 314; 277/641, 642, 643; 137/15.18, 15.25

(56) References Cited

U.S. PATENT DOCUMENTS

| | | | |
|---|---|---|---|
| 3,540,696 | * 11/1970 | Fawkes | 251/306 |
| 3,544,066 | 12/1970 | Fawkes | 251/306 |
| 4,006,882 | 2/1977 | Bonafous | 251/306 |
| 4,266,754 | 5/1981 | Ninomiya et al. | 251/306 |
| 4,899,775 | * 2/1990 | Calvin | 251/306 X |
| 4,993,720 | * 2/1991 | Ciotola | 277/641 |
| 5,071,140 | * 12/1991 | Quevedo Del Rio | 277/642 X |
| 5,263,444 | * 11/1993 | Prior et al. | 277/641 X |
| 5,538,029 | * 7/1996 | Holtgraver | 251/306 X |

* cited by examiner

Primary Examiner—Kevin Shaver
Assistant Examiner—Eric Keasel
(74) Attorney, Agent, or Firm—Howell & Haferkamp, LC

(57) ABSTRACT

An annular valve seal is configured for use in rotational-type valve assemblies with valve housings having an internal annular groove adapted to receive a portion of the seal therein. The seal comprises an annular interior surface and an annular exterior surface generally opposite the annular interior surface. The annular interior surface defines a central opening of the valve seal. A portion of the annular interior surface is adapted for engagement with a moveable valve element when the valve element is in a closed position to prevent fluid flow through the central opening of the valve seal. At least a portion of the annular exterior surface is receivable within the internal annular groove of the valve housing. The annular exterior surface includes a plurality of circumferentially spaced recesses therein or, alternatively, the annular exterior surface of the valve seal may include a plurality of circumferentially spaced projections protruding generally outwardly therefrom.

22 Claims, 3 Drawing Sheets

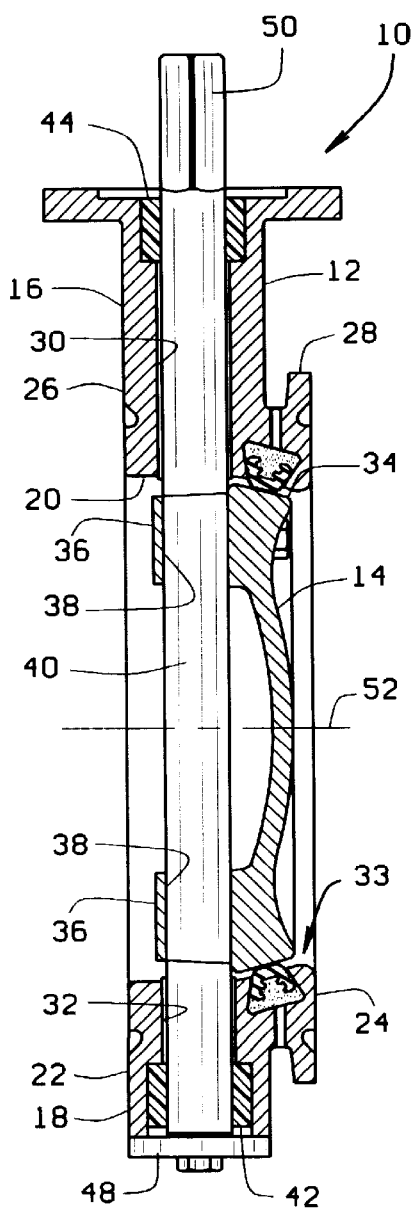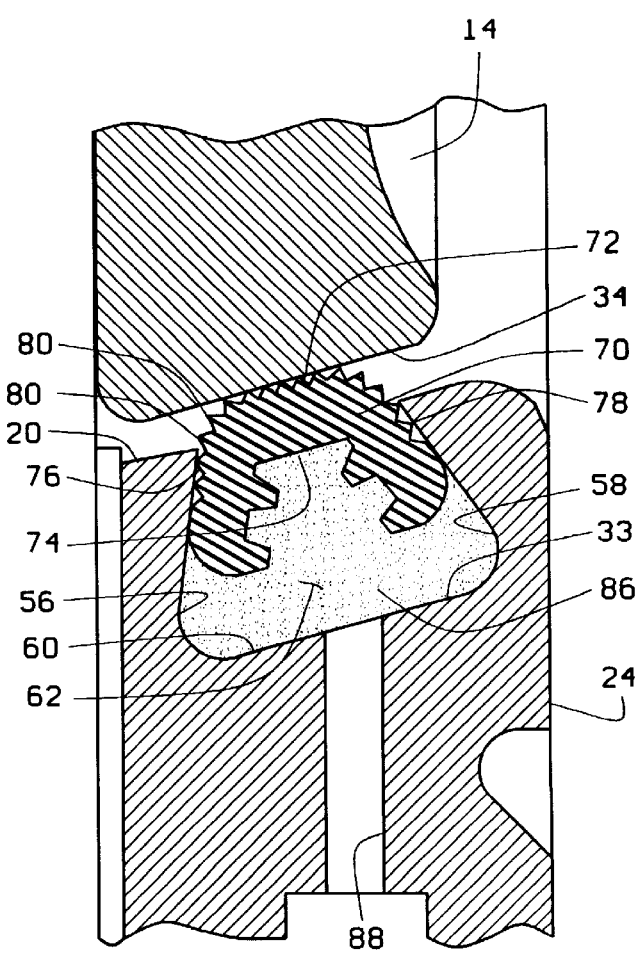

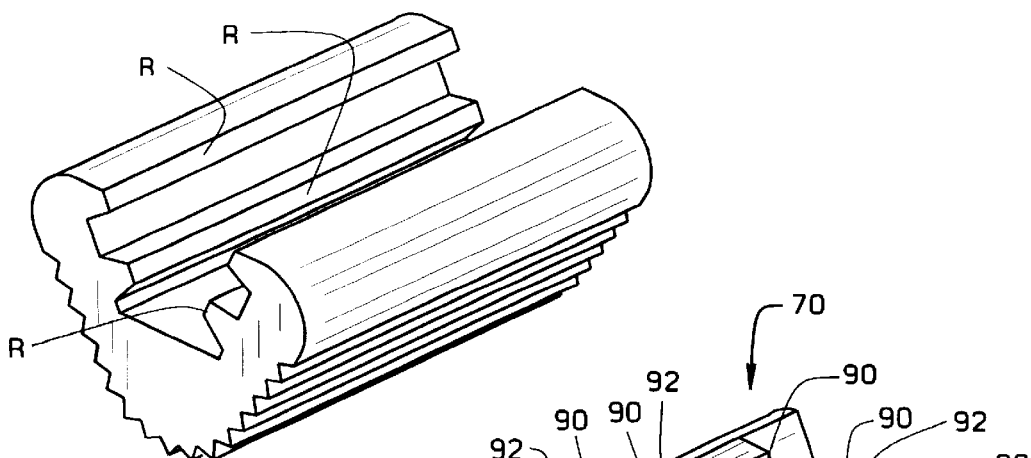
FIG. 5
PRIOR ART
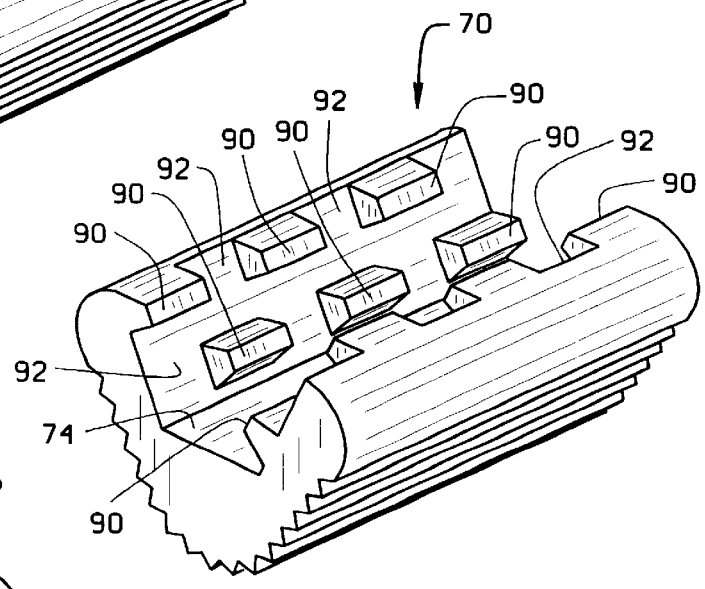
FIG. 6
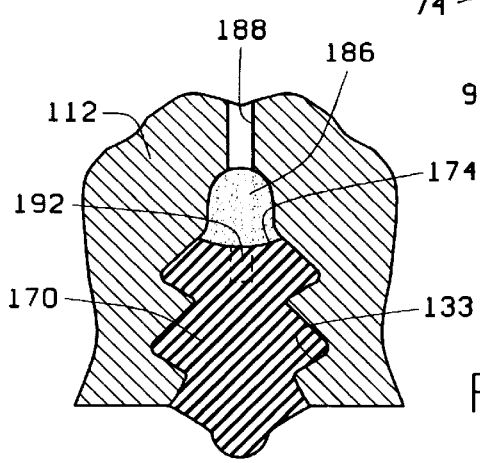
FIG. 7
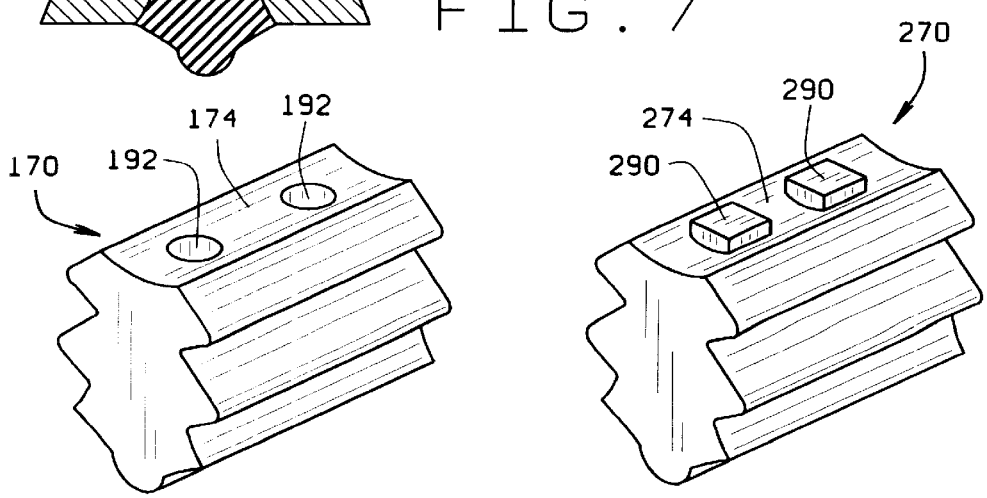
FIG. 8
FIG. 9

VALVE SEAL STRUCTURED TO PREVENT CIRCUMFERENTIAL SLIPPAGE

BACKGROUND OF THE INVENTION

The present invention is directed to valves and, more particularly, to resilient valve seals used in valves having moveable valve elements.

Valves having resilient valve seals are widely used in commerce and have a multitude of applications. Such valves are commonly used in fluid piping to start and stop the flow of fluid through the piping by opening and closing the valve. The specific construction of such valves differs widely depending on the application in which they are used. Generally, however, a valve of the type involved in the present invention includes a valve housing with an inlet port, an outlet port and a hollow interior defining a flow path between the inlet and outlet ports. A rotatable valve element is mounted within the interior of the valve housing for movement between an open position wherein the valve element permits fluid flow through the valve housing and a closed position wherein the valve element blocks the flow of fluid through the valve housing.

For example, in a butterfly valve, a rotatable disk is pivotally disposed within the hollow interior of the valve housing and is rotatable about an axis generally perpendicular to the flow path between a fully open position, in which it is generally parallel to the flow path, and a fully closed position in which it is generally perpendicular to the flow path. In the case of a spherical plug valve (also sometimes referred to as a "ball valve"), a rotatable plug or "ball" is pivotally disposed within the hollow interior of the valve housing and is rotatable between open and closed positions. In either case, the rotatable valve element is mounted to a shaft, which is itself rotatably mounted to the valve housing. As is well known in the art, the shaft may be connected to a mechanical drive mechanism or operated manually to rotate the shaft and thereby rotate the valve element within the valve body between the open and closed positions.

The interior surface of the valve body, which defines the flow path, includes an internal annular groove adapted to receive and retain a valve seal. The internal annular groove is located so that at least a portion of the valve seal retained therein lies in the plane of the valve element, perpendicular to the flow path and located so that it will engage with the valve element in a leak-tight engagement when the valve element is rotated to its closed position. The valve seal may be retained in the annular groove in a variety of ways well known in the art, including adhesives, frictional engagement, welding, and riveting.

In some prior art valve structures, such as the one disclosed in U.S. Pat. No. 3,544,066 (the '066 patent), a curable polymeric material, such as an epoxy resin, is used to retain the valve seal within the internal annular groove of the valve body. First, the valve seal is inserted into the internal annular groove. Then, the epoxy resin or other polymeric material is introduced, in liquid form, between the annular exterior surface of the seal and the internal annular groove. Finally, the resin is allowed to cure to a solid condition. The annular exterior surface of the valve seal disclosed in the '066 patent includes a plurality of annular ridges, which grippingly engage the cured resin and help to retain the seal within the groove.

In general, under low stress conditions (e.g., under low differential pressure conditions), as in normal opening and closing of the valve where any throttling action is brief, cumulative circumferential movement of the valve seal will usually not result in any significant increase in the seal's cross-section. However, under higher stress conditions, seals of the type disclosed in the '066 patent may fail to maintain an effective seal. For example, under extended periods of throttled flow, where an extreme pressure differential exists between the upstream and downstream sides of the valve (e.g., when a valve is only slightly open and fluid is forced through a highly restricted area), pressures acting on the seal may cause portions of the seal to slip circumferentially along the internal annular groove of the valve housing. Such circumferential slippage causes thickening or "bulging" of the seal (i.e., an increased cross-sectional area of the seal) in the areas of throttled flow, and stretching or "thinning" of the seal (i.e., a decreased cross-sectional area of the seal) in other areas. In cases of extreme circumferential slippage, thickened or "bulged" sections of the seal may interfere with proper closing of the valve, may result in shear damage to the seal, and may overstress actuator components. In addition, in the areas of the seal where stretching or "thinning" occurs, higher upstream pressures may be introduced behind the seal through the reduced cross-sectional area of the seal in tension, which can result in those portions of the seal being pulled out of the internal annular groove (referred to as a "blowout").

Thus there is a need for a valve seal that will withstand high stress flow conditions without losing its ability to maintain an effective seal. Further, in certain extremely high stress conditions, such as a throttled flow condition, there is a need for a valve seal that will resist circumferential slippage of portions of the valve seal. Still further, there is a need for a valve seal having all of the above-described advantages over the prior art and which does not require a complex or cumbersome installation.

SUMMARY OF THE INVENTION

Among the several advantages of the present invention over the prior art may be noted the provision of a valve seal that is capable of withstanding high stress flow conditions without losing its ability to maintain an effective seal; the provision of a valve seal that is constructed to resist circumferential slippage even in extremely high stress flow conditions, such as a throttled flow condition; and the provision of a valve seal having the above-described advantages over prior art seals and which does not require a complex or cumbersome installation.

In general, an annular valve seal of the present invention is configured for use in valve housings having an internal annular groove adapted to receive a portion of the seal therein. The seal comprises an annular interior surface and an annular exterior surface generally opposite the annular interior surface. The annular interior surface defines a central opening of the valve seal. A portion of the annular interior surface is adapted for engagement with a moveable valve element when the valve element is in a closed position to prevent fluid flow through the central opening of the valve seal. At least a portion of the annular exterior surface is receivable within the internal annular groove of the valve housing. The annular exterior surface includes a plurality of circumferentially spaced recesses therein.

In another aspect of the present invention, the annular exterior surface of the valve seal includes a plurality of circumferentially spaced projections protruding generally outwardly therefrom, rather than a plurality of circumferentially spaced recesses.

In yet another aspect of the invention, a valve comprises a valve housing, a moveable valve element positioned within the valve housing, and an annular valve seal. The valve housing has an internal annular groove. The moveable valve element is adapted for movement between an open position wherein the valve element permits fluid flow through the valve housing and a closed position wherein the valve element prevents fluid flow through the valve housing. The annular valve seal has an annular interior surface and an annular exterior surface generally opposite the annular interior surface. At least a portion of the annular exterior surface is received within the internal annular groove of the valve housing. The annular interior surface of the valve seal defines a central opening of the valve seal. A portion of the annular interior surface is adapted for engagement with the moveable valve element when the valve element is in its closed position to prevent fluid flow through the central opening of the valve seal. The annular exterior surface includes a plurality of circumferentially spaced recesses therein. Alternatively, the annular exterior surface may include a plurality of circumferentially spaced projections protruding generally outwardly therefrom.

In still another aspect of the invention, a method is provided for preventing circumferential movement of an annular valve seal. In general, the method comprises the steps of providing an annular valve seal having an annular interior surface defining a central opening of the valve seal and a generally opposite annular exterior surface including a plurality of circumferentially spaced recesses therein; inserting the annular valve seal into an internal annular groove of a valve body so that at least a portion of the annular exterior surface of the seal is received within an internal annular groove to define an annular cavity between the annular exterior surface of the seal and the internal annular groove of a valve body; filling at least a part of the annular cavity with a curable polymeric material so that the curable polymeric material engages the internal annular groove of the valve body, engages the annular exterior surface of the seal, and occupies portions of at least some of the circumferentially spaced recesses in the annular exterior surface of the valve seal; and allowing the curable polymeric material to cure to a solid condition.

In an alternative method, the step of providing an annular valve seal having an annular exterior surface with a plurality of circumferentially spaced recesses therein is replaced with the step of providing an annular valve seal having an annular exterior surface with a plurality of circumferentially spaced projections protruding outwardly therefrom, and the step of filling a part of the annular cavity with a curable polymeric material that occupies portions of the circumferentially spaced recesses in the annular exterior surface is replaced with the step of filling a part of the annular cavity with a curable polymeric material that surrounds portions of at least some of the circumferentially spaced projections.

Other objects and features of the present invention will be in part apparent and in part pointed out hereinafter.

BRIEF DESCRIPTION OF THE DRAWINGS

FIG. 3 is a cross-sectional view of the valve assembly taken along the plane of line 3—3 in FIG. 2, with the valve assembly in the closed position;

FIG. 4 is a partial, cross-sectional view of the valve seal of the present invention;

FIG. 5 is a perspective view of a segment of a prior art valve seal;

FIG. 6 is a perspective view of a segment of the valve seal of FIG. 4;

FIG. 7 is a partial, cross-sectional view of a second embodiment of a valve seal of the present invention;

FIG. 8 is a perspective view of a segment of the valve seal of FIG. 7; and

FIG. 9 is a perspective view of a segment of a third embodiment of a valve seal of the present invention.

Reference characters in the written specification indicate corresponding parts throughout the several views of the drawings.

DETAILED DESCRIPTION OF THE PREFERRED EMBODIMENTS

Figure 1:
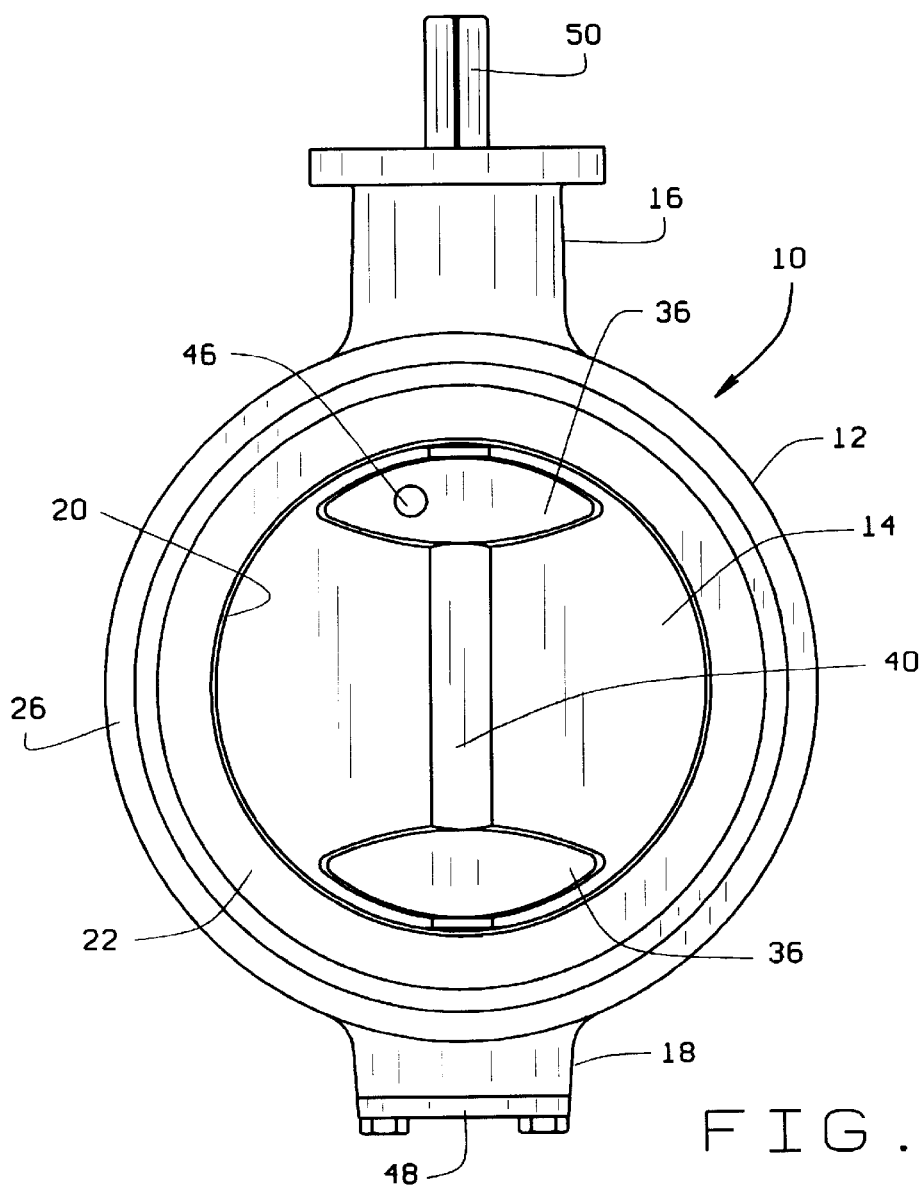
FIG. 1 is an elevation view of a rotational-type valve assembly of the present invention in the closed position.
Figure 2:
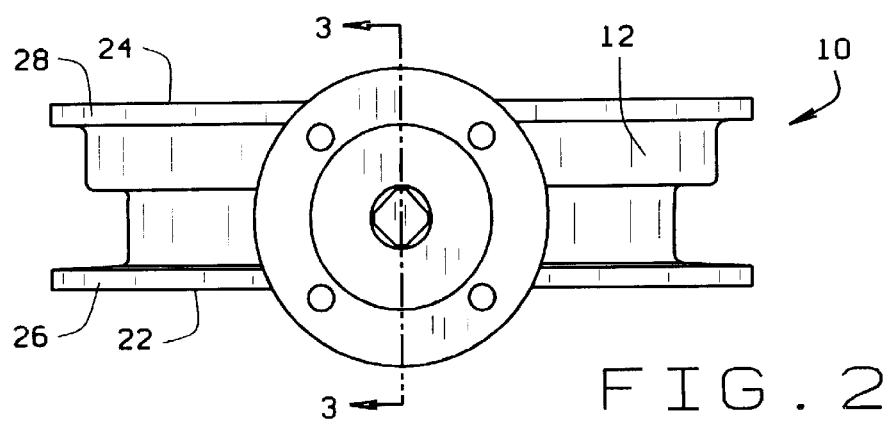
FIG. 2 is a top plan view of the valve assembly of FIG. 1.

FIGS. 1 and 2 show a conventional disk valve in a valve housing, which is one operative environment in which the present invention may be employed. However, the environment of the invention shown in FIGS. 1 and 2 is only one example as to how the valve seal of the invention may be employed, and it should not be interpreted as the only environment in which the valve seal may be employed. For example, the valve seal of the present invention may also be employed in a spherical plug valve (or "ball valve") assembly, a gate valve assembly, or any other valve assembly having a moveable valve element that is brought into and out of sealing engagement with a resilient annular valve seal. Therefore, the operative environment disclosed hereinafter should not be interpreted as limiting the scope of the invention.

The rotatable disk valve assembly 10 shown in the drawing figures includes a valve housing 12 and a disk valve element 14 mounted in the housing for pivoting movement of the disk valve between open and closed positions of the valve. Because the disk valve assembly 10 is only one environment in which the valve seal of the invention may be employed, and because its construction is for the most part conventional, it will only be described generally herein.

The valve housing 12 is generally cylindrical except for an upper shaft hub 16 and a lower shaft hub 18 that project from radially opposite ends of the housing exterior surface. A generally cylindrical interior bore surface 20 passes through the valve housing from an upstream end 22 to a downstream end 24 of the housing. As viewed in FIG. 3, the upstream end 22 of the interior bore is at the left side of the housing and the downstream end 24 of the bore is at the right side of the housing, although the direction of the flow of liquid through the valve housing 12 is not critical to the operation of the present invention, and could be reversed. The housing exterior surface is provided with a circular upstream flange 26 and a circular downstream flange 28. The flanges are employed in connecting the valve housing 12 between adjacent upstream and downstream lengths of pipe (not shown). As is conventional, the housing can be connected between the two lengths of pipe by threaded fasteners inserted through aligned holes of the flanges 26, 28 of the valve housing and mating flanges of the upstream and downstream lengths of pipe. Alternatively, and depending on the size of the particular valve assembly 10 with which the invention is used, connections between the valve housing 12 and adjacent lengths of pipe can be accomplished with complementary threaded connectors and other known means of connecting pipe to valve housings.

As shown in FIG. 3, an upper section of a shaft hole 30 passes through the upper shaft hub 16 and a lower section of a shaft hole 32 passes through the lower shaft hub 18. Positioned just downstream from the shaft holes is an internal annular groove 33 formed in the bore interior surface 20 and extending completely around the bore interior surface.

The disk valve element 14 has a circular configuration with a generally cylindrical or frustoconical sealing surface 34 extending around its periphery. A pair of ridges 36 extend across an upstream face of the valve. Aligned shaft holes 38 extend through the ridges. A shaft 40 passes through the upper section of the shaft hole 30 in the upper shaft hub 16, through the pair of shaft holes 38 in the valve element ridges 36, and into the lower shaft hole section 32 in the lower shaft hub 18 of the valve housing. The lower end of the shaft 40 is received for rotation in a pivot bushing and seal assembly 42 represented at the bottom of the lower section of the shaft hole 32. The opposite end of the shaft 40 is received in a pivot bushing and seal assembly 44 represented at the top of the upper section of the shaft hole 30. Referring to FIG. 1, a key pin 46 passes through a hole in the upper disk valve ridge 36 and into a notch (not shown) in the shaft 40 securing the disk valve element 14 and the shaft 40 together. A circular flange 48 is secured to the lower shaft hub 18 over the lower bushing and sealing assembly 42. A stub portion 50 at the opposite end of the shaft 40 projects from the upper shaft hub 16 of the valve housing. An actuator of any known type, either manually operated or mechanically operated, is connected to the stub shaft 50 and is operated to rotate the shaft and the attached valve element 14 between their opened and closed positions.

A closed position of the valve element 14 relative to the valve housing 12 is shown in FIGS. 1, 3 and 4. In this position, the valve element 14 is positioned generally perpendicular to the center axis 52 of flow through the center bore 20 of the valve housing. To completely open the valve element 14, the shaft 40 and attached valve element 14 are rotated 90° to position the disk valve element 14 generally parallel to the axis 52 of fluid flow through the bore 20 of the valve housing.

FIG. 3 shows a cross-section of the internal annular groove 33 in the interior bore surface 20 of the valve housing 12, and FIG. 4 shows the groove in more detail. Referring to FIG. 4, the groove is formed with an upstream sidewall 56, a downstream sidewall 58 and a bottom wall 60, all of which extend completely around the cylindrical bore interior surface 20 of the valve housing. Together, the groove bottom wall 60, upstream sidewall 56 and downstream sidewall 58 surround and define an annular void or channel 62 of the groove. As shown in FIG. 4, the cross-section of the groove is generally trapezoidal with the outer edges of the upstream and downstream sidewalls 56 and 58 near the bottom wall 60 having a spacing greater than the inner edges of the upstream and downstream sidewalls 56 and 58. This facilitates retention of an annular valve seal 70 within the groove 33, as will be explained.

The construction of the disk valve assembly 10 to this point is, for the most part, conventional and many of the described component parts, and the features of their construction, can be found in various types of known valve assemblies. However, as will be explained, the annular valve seal 70 is an improvement over prior art valve seals.

The valve seal 70 of the invention is preferably constructed of a resilient, compressible material of the type typically used in valve seals, e.g., rubber. As shown in FIG. 4, the valve seal 70 includes an annular interior surface 72, an annular exterior surface 74 generally opposite the annular interior surface, an upstream side surface 76 and a downstream side surface 78. The annular interior surface 72 defines a central opening of the valve seal 70. A portion of the annular interior surface 72 defines a seating surface, which is adapted for engagement with the disk valve element 14 when the disk valve element is in a closed position to prevent fluid flow through the central opening of the valve seal 70. As explained below, at least a portion of the annular exterior surface 74 of the valve seal 70 is received within the internal annular groove 33 of the valve housing 12. As shown in FIG. 4, the upstream and downstream side surfaces 76 and 78 are angled relative to one another to give the valve seal 70 a generally trapezoidal cross-section. When the valve seal 70 is inserted into the groove 33, the angled side surfaces 76 and 78 engage with the upstream and downstream sidewalls 56 and 58 of the groove 33, which facilitates retention of an valve seal 70 within the groove 33.

In the preferred embodiment, the annular interior surface 72 (or seating surface) of the valve seal 70 includes a plurality of laterally spaced annular ridges 80, which engage with the sealing surface 34 of the disk valve element 14 when the disk valve element is in a closed position. The ridges 80 provide a reduced contact area between the sealing surface 34 of the disk valve 14 and the interior surface 72 of the valve seal 70, which reduces the torque required to open and close the disk valve element 14.

Preferably, a body of polymeric material 86 is introduced into the annular channel 62 behind the annular exterior surface 74 of the valve seal 70. As explained below, the polymeric body 86 engages with the internal annular groove 33 and the annular exterior surface 74 of the valve seal 70 in a manner to retain the annular exterior surface 74 of the valve seal 70 within the groove 33. The polymeric body is preferably of a curable polymeric material, such as an epoxy resin, that has cured to a solid condition. The general concept of using a curable epoxy resin to retain a valve seal within an annular groove of a valve body is disclosed in U.S. Pat. No. 3,544,066 (the '066 patent). Similarly, in the present invention, the valve seal 70 first is inserted into the internal annular groove 33. Then, the epoxy resin or other polymeric material is introduced in liquid form, via an inlet port 88, into the annular channel 62 between the annular exterior surface 74 of the seal 70 and the groove 33. Finally, the resin is allowed to cure to a solid condition.

FIG. 5 shows a segment of a prior art valve seal of the type disclosed in the '066 patent. The annular exterior surface of the valve seal disclosed in the '066 patent includes a plurality of annular ridges R, which grippingly engage the cured resin and help to retain the seal within the groove. However, the ridges R extend completely around the seal. Therefore, although the gripping engagement of the ridges R with the cured resin will resist forces pulling radially inwardly on the seal, they will not resist circumferential (or tangential) forces acting on the seal, which may cause portions of the seal to slip circumferentially along the internal annular groove of the valve housing.

FIG. 6 shows a segment of the valve seal 70 of the present invention. As distinguished from the prior art valve seal shown in FIG. 5, the annular exterior surface 74 of the valve seal 70 includes a plurality of circumferentially spaced projections 90 protruding therefrom. The projections 90 define a series of circumferentially spaced recesses 92 therebetween.

When the epoxy resin (or other polymeric material) is introduced in liquid form, via the inlet port 88, into the annular channel 62 behind the annular exterior surface 74 of the seal 70, the resin will flow around the projections 90 and into the recesses 92. Once the epoxy resin has cured to a solid condition, portions of the cured resin body 86 occupy the circumferentially spaced recesses 92, and the circumferentially spaced projections 90 protrude into other portions of the cured resin body 86. Thus, the projections 90 and recesses 92 of the valve seal 70 on the one hand and the cured resin body 86 on the other hand grippingly engage one another, much like the teeth of two gears meshing with one another, to prevent circumferential movement of the valve seal relative to the cured resin body 86 and, thus, the valve housing 12.

Thus, in accordance with the above, a method is provided for preventing circumferential movement of an annular valve seal within an internal annular groove of a valve housing. In general, the method comprises the steps of providing an annular valve seal 70 having an annular interior surface 72 defining a central opening of the valve seal and a generally opposite annular exterior surface 74 including a plurality of circumferentially spaced recesses therein 92; inserting the annular valve seal 70 into an internal annular groove 33 of a valve body 12 so that at least a portion of the annular exterior surface 74 of the seal is received within an internal annular groove 33 to define an annular cavity 62 between the annular exterior surface 74 of the seal 70 and the internal annular groove 33 of a valve body 12; filling at least a part of the annular cavity 62 with a curable polymeric material 86 so that the curable polymeric material 86 engages the internal annular groove 33 of the valve body 12, engages the annular exterior surface of the seal 74, and occupies portions of at least some of the circumferentially spaced recesses 92 in the annular exterior surface 74 of the valve seal; and allowing the curable polymeric material 86 to cure to a solid condition. Preferably, the curable polymeric material 86 is in a liquid (flowable) form during the filling step.

In an alternative method, the step of providing an annular valve seal having an annular exterior surface with a plurality of circumferentially spaced recesses therein is replaced with the step of providing an annular valve seal 70 having an annular exterior surface 74 with a plurality of circumferentially spaced projections 90 protruding outwardly therefrom, and the step of filling a part of the annular cavity with a curable polymeric material that occupies portions of the circumferentially spaced recesses in the annular exterior surface is replaced with the step of filling a part of the annular cavity 62 with a curable polymeric material 86 that surrounds portions of at least some of the circumferentially spaced projections 90. Again, the curable polymeric material 86 is preferably in a liquid (flowable) form during the filling step.

FIGS. 7 and 8 show a second embodiment of the present invention. FIG. 7 is a partial, cross-sectional view of a valve seal 170 received within an internal annular groove 133 of a valve housing 112. As with the first embodiment of the invention described above, a body of polymeric material 186 is introduced in liquid form, via an inlet port 188, into the annular void behind the annular exterior surface 174 of the valve seal 170. As shown in FIG. 8, the annular exterior surface 174 of the valve seal 170 includes a plurality of circumferentially spaced recesses 192 therein. When the polymeric material is introduced in liquid form, it will flow into the recesses 192. Once the polymeric material has cured to a solid condition, portions of the cured polymeric body 186 occupy the circumferentially spaced recesses 192. Although the recesses 192 shown in FIG. 8 are represented as being circular, it should be understood that recesses having various other shapes could be used without departing from the scope of the present invention.

FIG. 9 shows a third embodiment of the present invention. The valve seal 270 shown in FIG. 9 includes, on its annular exterior surface 274, a plurality of circumferentially spaced, generally rectangular projections 290 protruding therefrom. When the polymeric material is introduced in liquid form, it will flow around the projections 290 and, once the polymeric material has cured to a solid condition, the projections 290 will protrude into portions of the cured polymeric body. Although the projections 290 shown in FIG. 9 are represented as being generally rectangular, it should be understood that projections having various other shapes could be used without departing from the scope of the present invention.

Although the valve seals of the present invention (i.e., 70, 170 and 270) have been described as being "annular," it should be understood that the circumferential restraint mechanism (e.g., the projections 90 and 290 and the recesses 92 and 192, which grippingly engage with the cured epoxy 86, 186 and 286) of the invention could also be employed in valve seals that are not perfectly annular, or that do not extend a full 360 degrees around the valve. For example, the novel circumferential restraint mechanism described herein would function similarly to prevent circumferential slippage in valves that have resilient seals extending only partially around the circumference of the valve. The novel restraint mechanism described herein would also function similarly to slippage in valves that have generally linear resilient seals, e.g., gate valves.

Also, although the valve seals of the present invention have been described as being mounted within the internal groove (33 and 133) in the valve housing (12 and 112), it should be understood that, in an alternate embodiment, a circumferential restraint mechanism of the invention (similar to the projections 90 and 290 and the recesses 92 and 192, which grippingly engage with the cured epoxy 86, 186 and 286) could be used in valve seals that are mounted on or in the sealing surface 34 of the moveable valve element 14. In such an alternate embodiment, the valve body may include a rigid (e.g., stainless steel) mating surface, rather than a resilient seal, for engaging the resilient seal of the valve element.

While the present invention has been described by reference to certain specific embodiments, it should be understood that modifications and variations of the invention may be constructed without departing from the scope of the invention defined in the following claims.

What is claimed is:

1. An annular valve seal for use in valve housings having an internal annular groove adapted to receive a portion of the seal therein, the seal comprising:

an annular interior surface defining a central opening of the valve seal, the central opening having a center axis, a portion of the annular interior surface being adapted for engagement with a moveable valve element when the valve element is in a closed position to prevent fluid flow through the central opening of the valve seal; and an annular exterior surface generally opposite the annular interior surface, at least a portion of the annular exterior surface being receivable within the internal annular groove of the valve housing, the annular exterior surface including a plurality of recesses therein, the recesses being circumferentially spaced about the center axis of the central opening of the valve seal.

2. The annular valve seal of claim 1 wherein the annular exterior surface is adapted for engagement with a polymeric body within the internal annular groove in a manner to retain the annular exterior surface of the valve seal within the groove.

3. The annular valve seal of claim 2 wherein said circumferentially spaced recesses are adapted to receive portions of the polymeric body in a manner to prevent circumferential movement of the valve seal about the center axis of the central opening relative to the polymeric body.

4. An annular valve seal for use in valve housings having an internal annular groove adapted to receive a portion of the seal therein, the seal comprising:

an annular interior surface defining a central opening of the valve seal, the central opening having a center axis, a portion of the annular interior surface being adapted for engagement with a moveable valve element when the valve element is in a closed position to prevent fluid flow through the central opening of the valve seal; and an annular exterior surface generally opposite the annular interior surface, at least a portion of the annular exterior surface being receivable within the internal annular groove of the valve housing, the annular exterior surface including a plurality of projections protruding generally outwardly therefrom, the projections being circumferentially spaced about the center axis of the central opening of the valve seal.

5. The annular valve seal of claim 4 wherein the annular exterior surface is adapted for engagement with a polymeric body within the internal annular groove in a manner to retain the annular exterior surface of the valve seal within the groove.

6. The annular valve seal of claim 5 wherein said circumferentially spaced projections are adapted to protrude into portions of the polymeric body in a manner to prevent circumferential movement of the valve seal about the center axis of the central opening relative to the polymeric body.

7. A valve comprising:

a valve housing having an internal annular groove;

a moveable valve element positioned within the valve housing and adapted for movement between an open position wherein the valve element permits fluid flow through the valve housing and a closed position wherein the valve element prevents fluid flow through the valve housing; and an annular valve seal having an annular interior surface and an annular exterior surface generally opposite the annular interior surface, at least a portion of the annular exterior surface being received within the internal annular groove of the valve housing, the annular interior surface defining a central opening of the valve seal, the central opening having a center axis, a portion of the annular interior surface being adapted for engagement with the moveable valve element when the valve element is in its closed position to prevent fluid flow through the central opening of the valve seal, the annular exterior surface including a plurality of recesses therein, the recesses being circumferentially spaced about the center axis of the central opening of the valve seal.

8. The valve of claim 7 wherein the internal annular groove has opposed sidewalls and portions of the annular valve seal engage with the sidewalls of the internal annular groove to define an annular channel between the valve seal and the groove.

9. The valve of claim 8 further comprising a polymeric body within the annular channel, the polymeric body engaging the annular exterior surface of the valve seal and the internal annular groove in a manner to retain the annular exterior surface of the valve seal within the groove.

10. The valve of claim 9 wherein portions of the polymeric body are received within the circumferentially spaced recesses of the annular exterior surface of the valve seal in a manner to prevent movement of the valve seal about the center axis of the central opening relative to the polymeric body and valve body.

11. The valve of claim 10 wherein the polymeric body is of a curable polymeric material that has cured to a solid condition.

12. The valve of claim 11 wherein the polymeric body is an epoxy resin.

13. The valve of claim 7 wherein the annular valve seal is of a resilient material that is elastically deformable.

14. A valve comprising:

a valve housing having an internal annular groove;

a moveable valve element positioned within the valve housing and adapted for movement between an open position wherein the valve element permits fluid flow through the valve housing and a closed position wherein the valve element prevents fluid flow through the valve housing; and an annular valve seal having an annular interior surface and an annular exterior surface generally opposite the annular interior surface, at least a portion of the annular exterior surface being received within the internal annular groove of the valve housing, the annular interior surface defining a central opening of the valve seal, the central opening having a center axis, a portion of the annular interior surface being adapted for engagement with the moveable valve element when the valve element is in its closed position to prevent fluid flow through the central opening of the valve seal, the annular exterior surface including a plurality of projections protruding generally outwardly therefrom, the projections being circumferentially spaced about the center axis of the central opening of the valve seal.

15. The valve of claim 14 wherein the internal annular groove has opposed sidewalls and portions of the annular valve seal engage with the sidewalls of the internal annular groove to define an annular channel between the valve seal and the groove, the valve further comprising a polymeric body within the annular channel, the polymeric body engaging the annular exterior surface of the valve seal and the internal annular groove in a manner to retain the annular exterior surface of the valve seal within the groove.

16. The valve of claim 15 wherein said circumferentially spaced projections protrude into portions of the polymeric body in a manner to prevent movement of the valve seal about the center axis of the central opening relative to the polymeric body and valve body.

17. The valve of claim 16 wherein the polymeric body is of a curable polymeric material that has cured to a solid condition.

18. The valve of claim 14 wherein the annular valve seal is of a resilient material that is elastically deformable.

19. A method for preventing circumferential movement of an annular valve seal, the method comprising the steps of:

providing an annular valve seal having an annular interior surface defining a central opening of the valve seal and an annular exterior surface generally opposite the annular interior surface, the central opening having a center axis, the annular exterior surface including a plurality of recesses therein, the recesses being circumferentially spaced about the center axis of the central opening of the valve seal;

inserting the annular valve seal into an internal annular groove of a valve body so that at least a portion of the annular exterior surface of the seal is received within the internal annular groove to define an annular cavity between the annular exterior surface of the seal and the internal annular groove of the valve body;

filling at least a part of the annular cavity with a curable polymeric material so that the curable polymeric material engages the internal annular groove of the valve body, engages the annular exterior surface of the seal, and occupies portions of at least some of the circumferentially spaced recesses in the annular exterior surface of the valve seal; and allowing the curable polymeric material to cure to a solid condition.

20. The method of claim 19 wherein the curable polymeric material is in a flowable form during the step of filling at least a part of the annular cavity.

21. A method for preventing circumferential movement of an annular valve seal, the method comprising the steps of:

providing an annular valve seal having an annular interior surface defining a central opening of the valve seal and an annular exterior surface generally opposite the annular interior surface, the central opening having a center axis, the annular exterior surface including a plurality of projections protruding generally outwardly therefrom, the projections being circumferentially spaced about the center axis of the central opening of the valve seal;

inserting the annular valve seal into an internal annular groove of a valve body so that at least a portion of the annular exterior surface of the seal is received within the internal annular groove to define an annular cavity between the annular exterior surface of the seal and the internal annular groove of the valve body;

filling at least a part of the annular cavity with a curable polymeric material so that the curable polymeric material engages the internal annular groove of the valve body, engages the annular exterior surface of the seal, and surrounds portions of at least some of the circumferentially spaced projections; and allowing the curable polymeric material to cure to a solid condition.

22. The method of claim 21 wherein the curable polymeric material is in a flowable form during the step of filling at least a part of the annular cavity.

\* \* \* \* \*